US012157297B2

(12) United States Patent
Michel et al.

(10) Patent No.: US 12,157,297 B2
(45) Date of Patent: Dec. 3, 2024

(54) DOCTOR BLADE STRIP FOR CUTTING TO LENGTH FOR USE IN PRINTING

(71) Applicant: Daetwyler Swisstec AG, Bleienbach (CH)

(72) Inventors: Martin Michel, Gondiswil (CH); Peter Weiss, Grenchen (CH)

(73) Assignee: DAETWYLER SWISSTEC AG, Bleienbach (CH)

( * ) Notice: Subject to any disclaimer, the term of this patent is extended or adjusted under 35 U.S.C. 154(b) by 0 days.

(21) Appl. No.: 17/925,901

(22) PCT Filed: Mar. 22, 2021

(86) PCT No.: PCT/EP2021/057303
§ 371 (c)(1),
(2) Date: Nov. 17, 2022

(87) PCT Pub. No.: WO2021/233591
PCT Pub. Date: Nov. 25, 2021

(65) Prior Publication Data

US 2023/0182464 A1 Jun. 15, 2023

(30) Foreign Application Priority Data

May 19, 2020 (EP) .................................... 20175462

(51) Int. Cl.
*B41F 15/44* (2006.01)
*B41F 31/20* (2006.01)

(52) U.S. Cl.
CPC .............. *B41F 15/44* (2013.01); *B41F 31/20* (2013.01)

(58) Field of Classification Search
CPC ................................ B41F 15/44; B41F 31/20
See application file for complete search history.

(56) References Cited

U.S. PATENT DOCUMENTS 2,283,830 A * 5/1942 Auburn ................... B41F 31/20 101/365
4,691,406 A * 9/1987 Goodnow ............. D21G 3/005 100/174
4,802,928 A * 2/1989 Dunlap ................... B05C 11/04 162/99

(Continued)

FOREIGN PATENT DOCUMENTS

CH 699806 A2 4/2010
DE 69914492 T2 12/2004

OTHER PUBLICATIONS

Machine Language Translation of DE69914492T2.
Machine Language Translation of CH699806A2.

*Primary Examiner* — David H Banh
(74) *Attorney, Agent, or Firm* — Timur Slonim, Esq.; KELLER SCHNEIDER PATENT -UND MARKENANWAITE

(57) ABSTRACT

A doctor blade band is disclosed. The doctor blade may be used for cutting individual doctor blades for printing technology, in particular for gravure printing, flexographic printing and/or screen printing. The doctor blade band includes a flat and elongate base body with a working edge region formed in a longitudinal direction. The doctor blade band has continuous predetermined breaking points running at defined intervals along the longitudinal direction transversely to the longitudinal direction.

20 Claims, 3 Drawing Sheets

(56) References Cited

U.S. PATENT DOCUMENTS

| | | | | | |
|---|---|---|---|---|---|
| 4,895,071 | A * | 1/1990 | Benton | B41F 9/1072 | 101/169 |
| 5,007,749 | A * | 4/1991 | Falconieri | B41J 33/18 | 400/208 |
| 5,138,740 | A * | 8/1992 | Goodnow | B05C 11/04 | 100/174 |
| 6,651,303 | B1 * | 11/2003 | Toivanen | B31F 1/14 | 242/563.2 |
| 8,202,395 | B2 * | 6/2012 | Eriksson | D21G 3/04 | 162/111 |
| 2004/0168279 | A1 * | 9/2004 | Eskelinen | B05C 11/026 | 15/256.53 |
| 2011/0247512 | A1 * | 10/2011 | Brudermann | B41F 9/1072 | 72/362 |
| 2018/0319156 | A1 * | 11/2018 | Claudon | D21G 3/005 | |
| 2021/0260865 | A1 * | 8/2021 | Bazin | D21G 3/005 | |
| 2022/0282349 | A1 * | 9/2022 | Omura | B23K 26/0846 | |

* cited by examiner

DOCTOR BLADE STRIP FOR CUTTING TO LENGTH FOR USE IN PRINTING

CROSS REFERENCE TO RELATED APPLICATIONS

This application is a nationalization of international application PCT/EP2021/057303, filed on Mar. 22, 2021, which claims priority to European patent application EP20175462.9, filed on May 19, 2020, the both of which are herein incorporated by reference.

BACKGROUND OF THE INVENTION

Field of the Invention

The present disclosure relates to a doctor blade band for cutting to length individual doctor blades for printing technology, and in particular doctor blades for gravure printing, flexographic printing and/or screen printing. Further, the present disclosure relates to methods for manufacturing such a doctor blade band.

Description of Related Art

Doctor blades are used in printing technology for scraping off excess printing ink from the surfaces of printing cylinders and printing rollers. Such doctor blades are usually based on a steel base body having a specially shaped working edge.

Particularly in gravure and flexographic printing, the quality of the doctor blade has a decisive influence on the print result. Uneven or irregular working edges of the doctor blade that are in direct contact with the printing cylinder lead, for example, to incomplete wiping of the printing ink from the webs of the printing cylinder. This can result in an uncontrolled release of printing ink onto the printing substrate. Doctor blades for printing technology must therefore be manufactured very precisely and adapted to the special requirements of the printing technology.

Since doctor blades are subject to constant wear during operation, they must be replaced after a certain period of use. Doctor blades are therefore frequently offered as semi-finished products in the form of rolled-up doctor blade bands or so-called endless bands. If a new doctor blade is required, it can be cut to the required length from the doctor blade band and mounted in the printing machine.

To facilitate cutting to length and simplifying the work for the end user when replacing doctor blades, it is known to cut the individual doctor blades to the required length in advance, then to reconnect them to each other at the face ends with strips of adhesive tape and roll them up to form a doctor blade band. Individual doctor blades can then be relatively easily separated from the doctor blade band, if required, by detaching the adhesive tape strip to the subsequent doctor blade. This eliminates the need for the end user to cut or trim the doctor blade band to the correct length.

However, in terms of manufacturing, this is a relatively costly solution due to the additional process steps involved.

There is therefore still a need for improved solutions in this art which do not have the aforementioned disadvantages.

BRIEF SUMMARY OF THE INVENTION

It is therefore an object of the presently disclosed invention to provide improved solutions for replacing worn doctor blades in printing technology. In particular, doctor blade bands for cutting doctor blades for printing technology to length are to be provided, which can be produced as efficiently as possible while enabling the individual doctor blades to be cut to length or separated easily. In particular, this is done in such a way that the quality of the doctor blades is not impaired during cutting and the safety of the end user is ensured.

According to a first aspect of the presently disclosed invention, a doctor blade band for cutting to length individual doctor blades for printing technology, in particular doctor blades for gravure printing, flexographic printing and/or screen printing, is provided, the doctor blade band comprising a flat and elongate base body having a working edge region formed in a longitudinal direction, characterized in that the doctor blade band has continuous predetermined breaking points extending transversely to the longitudinal direction at defined intervals along the longitudinal direction.

The doctor blade band or the individual doctor blades obtainable therefrom are designed for doctoring printing ink from a printing cylinder, an anilox roller and/or an inking roller.

As has been shown, the predetermined breaking points introduced in accordance with the present invention enable individual doctor blades to be separated or cut to length by simply buckling and forming a well-defined breaking edge. The properties and qualities of the individual doctor blades are not impaired during cutting to length. In particular, the doctor blades are neither deformed nor damaged at the particularly important working edge areas. In addition, the breaking edges are such that there is no significant risk of injury to the end user.

This is in contrast to doctor blade bands produced on a trial basis, which only had several spaced perforations instead of the continuous predetermined breaking points. In this case, less clearly defined breaking edges were produced during cutting to length by buckling, which also had pointed and sharp-edged areas. Accordingly, there is a considerable risk of injury with such doctor blades and the quality of the individual doctor blades can be impaired during cutting to length.

Doctor blades for printing technology are relatively thin compared to other blades. Typically, doctor blades for printing technology have a thickness of <0.4 mm. In addition, doctor blades for printing technology must be manufactured with particular precision, as they are in direct contact with the printing cylinders or rollers.

In particular, the doctor blade band has a thickness of 0.05-0.35 mm, especially 0.15 to 0.3 mm. This makes the doctor blades for printing technology suitable for typical applications. At the same time, with such thicknesses, well-defined predetermined breaking points can be introduced in doctor blade bands, which consist of the materials typically used in doctor blades for printing technology, in a reliable and efficient manner, which can be bent by hand for cutting to length.

The distances between the predetermined breaking points are in particular 10 cm-5 m, or in particular 20 cm-2 m. However, other distances are also possible within the scope of the presently disclosed invention.

A cross-sectional area of the doctor blade band can be rectangular or the cross-sectional area may have a shape deviating from a rectangle. The latter is the case, for example, when the doctor blade band is ground for structuring purposes.

In particular, the working edge of the doctor blade band has a ground finish. Preferably, the working edge is tapered towards the free end in one or more stages, beveled in a tapered wedge shape, chamfered and/or rounded. Different ground finishes can also be combined with each other. For example, the working edge can be tapered in one or more stages towards the free end and at the same time beveled at the free end.

Accordingly, the doctor blade band may be, for example, a lamellar doctor blade band, a wedge-ground doctor blade band, a chamfered doctor blade band and/or a rounded doctor blade band.

In the context of the present disclosure, the term "predetermined breaking point" refers to an area of the doctor blade band that breaks predictably under load due to its structure, shape and/or material properties.

The expression "transverse to the longitudinal direction" means in the present case that the predetermined breaking points run in a direction approximately perpendicular, in particular at an angle of 80-90°, preferably 90°, to the longitudinal direction of the doctor blade band.

The predetermined breaking points are continuous, which means that they extend over the entire width of the doctor blade band, in particular without interruption. Preferably, the predetermined breaking points run in a straight line.

The length of the doctor blade band in the present case stands, as usual, in particular for the dimension of the doctor blade band measured along the direction of the longest extension. The width of the doctor blade band may be, in particular, the dimension of the doctor blade band perpendicular to the length, which extends from the rear edge of the doctor blade opposite the working edge to the working edge. The thickness of the doctor blade band stands, in particular, for the extent of the doctor blade band perpendicular to the length and width, which extends from the upper side of the doctor blade band to its underside. In particular, the top side and bottom side form the two largest surfaces of the doctor blade band.

Typically, the length of the doctor blade band is greater than the width of the doctor blade band. Likewise, typically the width of the doctor blade band is greater than the thickness of the doctor blade band.

For example, the thickness of the doctor blade band is 0.03-1 mm and preferably 0.1-0.6 mm. The width of the doctor blade band is, in particular, 5-100 mm and preferably 8-80 mm. The length of the doctor blade band is, for example, 1-150 m, preferably 25-100 m.

The doctor blade band may have no perforations in the area of the predetermined breaking points. This prevents the formation of rough or undefined breaking edges. For special applications, however, it is also possible to provide one or more perforations in the area of the predetermined breaking points.

Preferably, the predetermined breaking points extend over the entire width of the doctor blade band, such that the doctor blade band is substantially uniformly weakened with respect to breaking behavior over the entire width of the doctor blade band.

According to a particular embodiment, the material of the doctor blade band, at the predetermined breaking points, has at least partially a different grain structure and/or microstructure than the areas of the doctor blade band which are adjacent to the predetermined breaking points in the longitudinal direction. This is particularly the case throughout the entire length of the predetermined breaking point. The length of the predetermined breaking point is measured in the direction of the width of the doctor blade band. In particular, the predetermined breaking points are made of the same material as the areas of the doctor blade band adjacent to the predetermined breaking points in the longitudinal direction and/or as the other areas of the doctor blade band.

In particular, the material of the doctor blade band, at the predetermined breaking points, has, at least partially, a higher hardness and/or brittleness than the areas of the doctor blade band which are adjacent to the predetermined breaking points in the longitudinal direction. This is particularly the case throughout the entire length of the predetermined breaking point. In particular, the predetermined breaking points are made of the same material as the areas of the doctor blade band adjacent to the predetermined breaking points in the longitudinal direction and/or as the other areas of the doctor blade band.

The term "hardness" is used here to refer to the Vickers hardness determined in accordance with the standard DIN EN ISO 6507-1:2018 to -4:2018.

In particular, a region of the predetermined breaking points with a different grain structure and/or microstructure and/or a region of the predetermined breaking points with higher hardness and/or brittleness extends in the direction of the thickness of the doctor blade band over the entire thickness of the predetermined breaking point. However, it is also possible that these areas extend over only part of the thickness.

In particular, a width of the predetermined breaking points, measured in the longitudinal direction of the doctor blade band, is 25-800 μm, especially 100-500 μm.

In particular, the predetermined breaking points each have a heat-affected zone or consist of them. Heat-affected zones can be formed by appropriate conditions when introducing the predetermined breaking points into the doctor blade body, e.g., by a suitable choice of process parameters during laser processing.

In a preferred embodiment, the doctor blade band has a substantially constant material thickness in the areas of the predetermined breaking points along the entire width of the doctor blade band. In other words, in this case the material thickness at the predetermined breaking points is essentially constant or of the same thickness. This means that particularly clean break edges can be obtained when cutting to length.

In principle, however, it is also possible to provide a material thickness varying along the width of the doctor blade band in the areas of the predetermined breaking points, if this is expedient.

A thickness or material thickness of the predetermined breaking points can be essentially the same as a thickness or material thickness of the doctor blade band in the areas which are adjacent to the predetermined breaking points in the longitudinal direction. In this case, the breaking behavior at the predetermined breaking points can be controlled, for example, by the material properties at the predetermined breaking points.

The predetermined breaking points may have continuous grooves running transverse to the longitudinal direction. In the area of the grooves, the doctor blade band is thus tapered and thus weakened.

The grooves are continuous, which means that they extend over the entire width of the doctor blade band and, in particular, are open at both end faces. Preferably, the grooves run in a straight line.

In particular, the grooves can have a constant cross-sectional area in the direction of the width of the doctor blade band. However, varying cross-sectional areas are also possible in principle. The latter can be advantageous, for example, in the case of specially shaped doctor blade bands, such as lamellar doctor blades, since this allows the material thickness in the region of the predetermined breaking point to be kept constant.

The doctor blade band may have no perforations in the area of the grooves. This reduces or prevents the formation of rough or undefined breaking edges.

For special applications, however, it is also possible to provide one or more perforations in the area of the grooves.

According to a preferred embodiment, the grooves have a decreasing width with increasing depth. The width of the grooves is measured in the longitudinal direction of the doctor blade band. In this way, clearly defined breaking edges are obtained when cutting to length by buckling.

In particular, the grooves have a U- or V-shaped cross-sectional area. This has proven to be the optimum shape.

However, grooves with other cross-sectional areas, e.g., with rectangular cross-sectional areas, are also possible.

Particularly preferably, the grooves have a depth of 20-80%, and especially 35-65%, of the thickness of the doctor blade band. This results in good buckling properties and a clean breaking edge with most materials used in doctor blades for printing technology.

In particular, the grooves have a depth of 20-150 μm, and especially 25-90 μm. This is particularly the case when the doctor blade has a base body made of steel.

The grooves in the widest area may have a width measured in the longitudinal direction of the doctor blade band of 20-500 μm, in particular of 50-200 μm. This is particularly the case if the doctor blade has a base body made of steel.

In particular, the doctor blade band has a different grain structure and/or microstructure in an edge region adjacent to the groove surface than an inner region of the doctor blade band located further inside the base body. In particular, both the edge region and the inner region are made of the same material.

In particular, the edge area is a heat-affected zone. The heat-affected zone can be formed by appropriate conditions when introducing the grooves into the doctor blade body, e.g., by a suitable choice of process parameters during laser processing.

According to a further advantageous embodiment, the doctor blade band has a higher hardness and/or brittleness in an edge region adjacent to the groove surface than an inner region of the doctor blade band located further inside the base body. In particular, both the edge region and the inner region are made of the same material.

The edge areas preferably have a thickness of 5-60%, and in particular 20-50%, of the depth of the respective groove.

In particular, the edge areas have a thickness of 1-50 μm, in particular 5-30 μm.

This is particularly the case when the doctor blade has a base body made of steel.

The special edge areas can be used to specifically improve the fracture behavior at the predetermined breaking point so that the breaking edge is even better defined or cleaner.

The edge areas can be characterized, for example, by preparing a polished section which is polished to a high gloss and examined under a reflected light microscope. Corresponding methods are known to the skilled person.

In a further embodiment, the predetermined breaking points, in particular the grooves, have a projection, in particular a rib-like projection, projecting beyond the surface of the doctor blade band. This allows the predetermined breaking point to be located haptically, which simplifies cutting to length.

In particular, the projection is arranged at the transition between predetermined breaking points, especially the grooves, and the areas of the doctor blade band adjacent thereto.

In particular, a rib-like projection running along the entire width of the doctor blade body is present in the longitudinal direction on both sides of each of the predetermined breaking points, and in particular the grooves.

According to a further advantageous embodiment, a projection is present both on the underside of the doctor blade band and on the upper side of the doctor blade band, in particular a rib-like projection.

The base body of the doctor blade band is made in particular of metal, plastic and/or a composite material. In particular, it is steel, thermoplastic material, thermoset material and/or fiber-reinforced plastic.

The base body may include or consist of metal, and in particular steel. The steel may be, for example, a carbon steel or a stainless steel.

According to a further advantageous embodiment, the doctor blade band has one or more coatings at least in a region of the working edge. The one or more coatings consist in particular of a different material than the base body. In particular, the material of the coating(s) differs in chemical composition from the material of the base body.

For example, the one or more coatings are a wear-reducing coating and/or a friction-reducing coating. For example, the coating may be a metal coating, a hard material coating, a ceramic coating, or a polymer coating. Such coatings can be used to further customize the doctor blade for specific applications.

Preferably, the predetermined breaking points, and in particular the grooves, are predetermined breaking points created by laser processing. In the case of laser processing, the processing is carried out by a laser light beam which is directed onto the areas to be processed on the doctor blade band and, due to the interaction of the laser light with the material of the doctor blade band, causes localized material modification and/or material removal or ablation, respectively.

Laser machining has proved to be a particularly advantageous method. On the one hand, the predetermined breaking points, in particular grooves, can be introduced by laser machining in a particularly efficient manner and with different dimensions, shapes and/or cross-sectional profiles. On the other hand, laser machining has the advantage that, with appropriate selection of the process parameters, grooves with the special edge areas as described above can be produced directly.

Since the doctor blade band is processed purely by laser light during laser processing and thus without interaction with a physical tool (such as in milling) or substances (e.g., in etching), the risk of contamination of the doctor blade band with wear material from the tool or substances can also be prevented. This is important in the case of doctor blades for printing technology, since even slight contamination in the area of the working edge can lead to significant losses in quality.

Further details on how to carry out the laser processing can be found later in connection with the process according to the invention.

The doctor blade band is preferably in the form of a roll, and in particular in a container with an opening for removing the doctor blade band. This allows the doctor blade band to be transported and stored in a space-saving manner. If a container is used, the doctor blade band can also be protected from damage and contamination and can be easily removed and cut to length through the opening.

A second aspect of the present invention relates to a method for producing a doctor blade band for cutting individual doctor blades to length for printing technology, wherein a doctor blade band to be processed is provided and continuous predetermined breaking points, in particular continuous grooves extending transversely to the longitudinal direction, are introduced into said band at defined intervals along a longitudinal direction.

The doctor blade band to be processed preferably has a base body made of metal, plastic and/or a composite material. In particular, it is steel, thermoplastic material, thermoset material and/or fiber-reinforced plastic. Steel, e.g., a carbon steel or a stainless steel, is particularly preferred.

In particular, the process is carried out in such a way that a doctor blade band results as described above, preferably with one or more of the features described above as optional.

According to a particularly preferred embodiment, the doctor blade band is moved continuously, preferably at constant speed, in the longitudinal direction during the insertion of the predetermined breaking points, and in particular the grooves. The speed is in particular 1-100 m/min, and preferably 10-50 m/min. This enables extremely efficient processing of the doctor blade band.

In this case, the tool used for introducing the predetermined breaking points can be moved along in the longitudinal direction in sections during processing, so that it is possible to introduce transversely running predetermined breaking points, in particular grooves, into the doctor blade band despite the movement of the doctor blade band.

According to a particularly preferred embodiment, the predetermined breaking points, in particular the grooves, are introduced by laser processing with a laser light beam. The advantages in this respect have already been described above in connection with the doctor blade band according to the invention.

In particular, the laser light beam is a continuous laser light beam or a pulsed laser light beam. A continuous laser light beam, also called a “continuous-wave laser light beam,” consists of light waves with a constant intensity over time. A pulsed light laser beam has a pulsating intensity of light waves. Corresponding laser processing systems are known to the skilled person per se.

The movement of the laser light beam can be achieved in laser processing by X deflection units for deflecting and focusing laser beams in one dimension or by XY deflection units for deflecting and focusing laser beams in two dimensions. For example, so-called galvanometer scanners with mirrors may also be suitable.

A power of the laser light beam during laser processing is preferably 5-100 W, and in particular 30-70 W. This allows the materials typically used for doctor blades, such as steel, to be well processed. For other materials or special doctor blades, however, lower or higher powers may also be suitable.

The light of the laser light beam may be UV light, visible light or infrared radiation. For example, a wavelength of the light is in the range of 150 nm-3 μm, and preferably 400 nm-2.5 m, and more particularly 500 nm-1.5 μm.

A focal diameter of the laser light steel at the point of impact on the doctor blade is advantageously 1-100 μm, and in particular 30-70 μm. This also allows relatively fine predetermined breaking points, and in particular grooves, to be created.

Preferably, the doctor blade band is moved continuously, and in particular at constant speed, in the longitudinal direction during the insertion of the predetermined breaking points, and at the same time a focus of the laser light beam on the doctor blade band is moved both in the longitudinal direction and perpendicularly thereto during processing. This enables a very high throughput to be achieved, since laser light beams can be moved extremely quickly and precisely by means of corresponding deflection units.

The process parameters during laser processing, and in particular the power and movement of the laser light beam, are controlled in such a way that the material properties are changed and/or material removal results.

In particular, when the material properties are changed, the grain structure, microstructure, hardness and/or brittleness are altered.

In particular, grooves are formed as a result of the material removal.

According to a particularly advantageous embodiment, the process parameters during laser processing, and in particular the power and movement of the laser light beam, are controlled in such a way that both grooves are formed and, at the same time, the grain structure, microstructure, hardness and/or brittleness of the doctor blade band is changed in the edge regions of the grooves.

According to an advantageous embodiment, the process parameters are controlled during laser processing in such a way that deformation of the doctor blade is reduced or prevented.

Preferably, the process is controlled by a control unit. In particular, the control unit controls the movement of the laser light beam, the movement of the doctor blade band and/or the power of the laser light beam.

In particular, the doctor blade band is rolled up after the grooves have been made and is preferably packed in a container.

Further advantageous embodiments and combinations of features of the invention result from the following detailed description and the totality of the patent claims.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

The drawings used to explain embodiments of the presently disclosed invention depict the following.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

In principle, the same parts are given the same reference signs in the figures.

Figure 1:
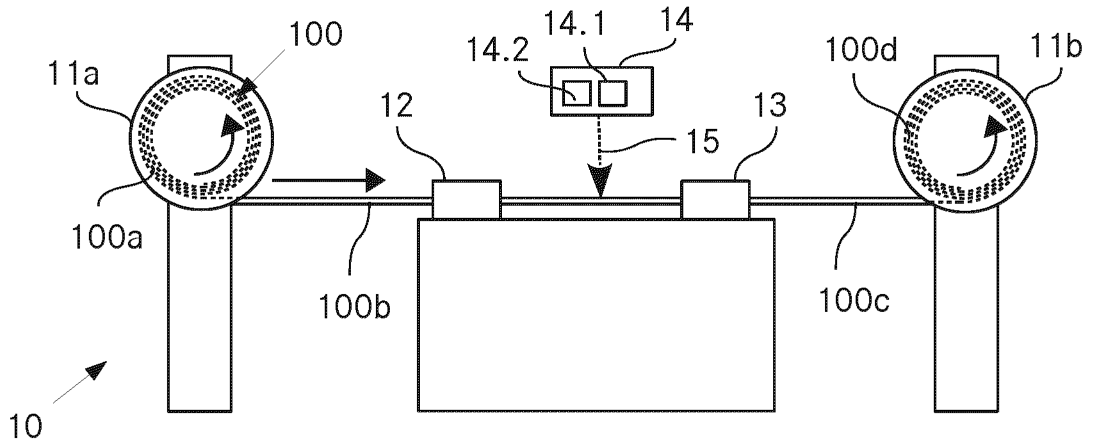
FIG. 1 depicts a device for continuous laser processing of a doctor blade band from the side.
Figure 2:
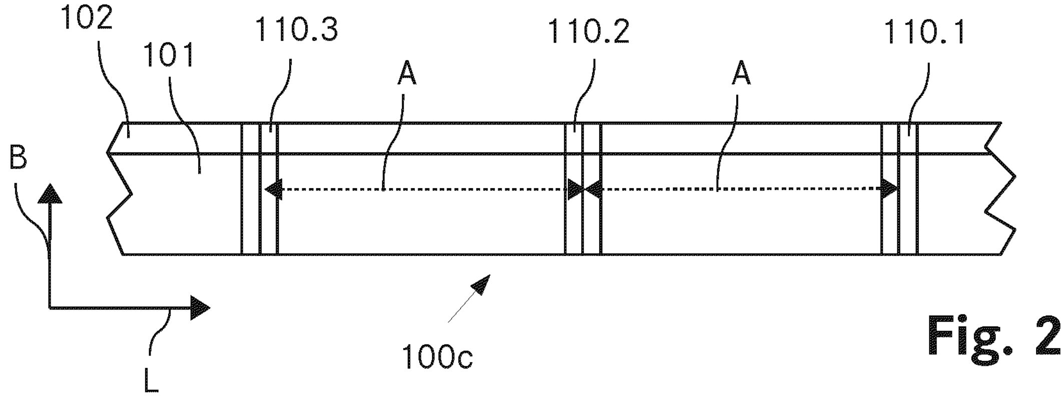
FIG. 2 depicts a schematic representation of a band section with V-shaped, continuous grooves processed with the device from FIG. 1 in a top view.
Figure 3:
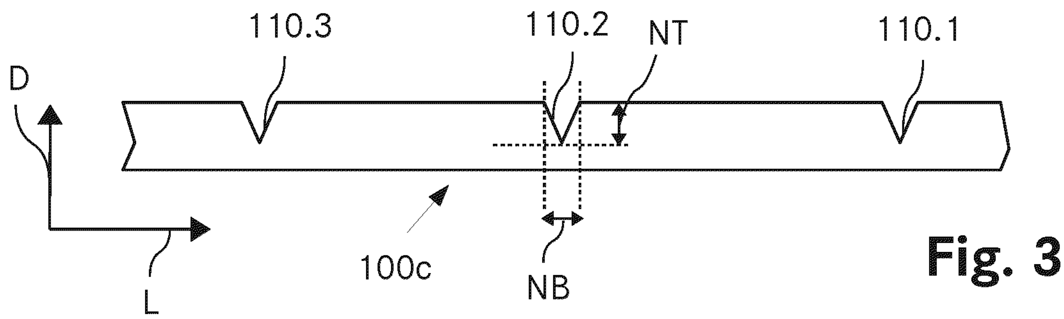
FIG. 3 depicts a schematic view of the machined band section from FIG. 2 from the side.

FIG. 1 depicts a device 10 for laser processing of a doctor blade band 100 from the side. FIGS. 2 and 3 depict the processed band sections 100*c* in a top view as well as from the side.

In FIG. 1, on the left-hand side, a wound-up band section 100*a* of the doctor blade band is present on a first spool 11*a*. The doctor blade band 100 is unwound continuously from the spool 11*a* and guided via a band centering device 12 past a laser processing station 14 through a band feed device 13 to a second spool 11*b*. The doctor blade band 100 has a base body 101 and a working edge 102 extending in the longitudinal direction L and tapered in a step-like manner (see FIG. 2). For example, it is a lamellar doctor blade band with a length of 50 m and a width of 50 mm, which is made, for example, of steel with a thickness of 0.15 mm.

In the area between coil 11*a* and laser processing station 14, there is an unwound and unprocessed band section 100*b* which enters the laser processing station 14 and is there provided with a laser light beam 15 at regular intervals with predetermined breaking points running transversely to the longitudinal direction of the doctor blade band 100 in the form of continuous grooves 110.1, 110.2, 110.3 (see FIGS. 2 and 3). The laser processing system 14 includes a laser light source 14.1, for example a fiber laser, with a downstream galvanometer scanner 14.2, with which the laser beam can be moved spatially. During processing, the doctor blade band is continuously moved past the laser processing station 14 at a constant speed of, for example, 30 m/min. A control unit ensures that the laser light beam 15 is moved over the doctor blade band 100 by the galvanometer scanner 14.2 in such a way that the transverse grooves are formed. The light of the laser light beam 15 has, for example, a wavelength of 1064 nm.

After the doctor blade band 100 has passed the laser processing station 14, the processed band section 100*c* passes to the second reel 11*b*, where the previously processed and wound band sections 100*d* are present.

FIG. 2 depicts the processed band section 100*c* of the doctor blade band 100 in a top view. Perpendicular to the longitudinal direction L of the doctor blade band 100*c*, three continuous V-shaped grooves 110.1, 110.2, 110.3 with a constant groove cross-section run parallel to the transverse direction B (=direction of the width). The grooves extend in a straight line over the entire width of the doctor blade band 100 and have a distance A between them of, for example, 50 cm. The V-shaped grooves 110.1, 110.2, 110.3 form predetermined breaking points at which the doctor blade band can be cut to length.

FIG. 3 depicts the machined band section 100*c* of the doctor blade band 100 in a top view from the side. Here, the V-shaped grooves have a width NB (measured along the longitudinal direction L) of, for example, 250 μm and a depth NT (measured along the direction of thickness D) of, for example, 50 μm.

Figure 4:
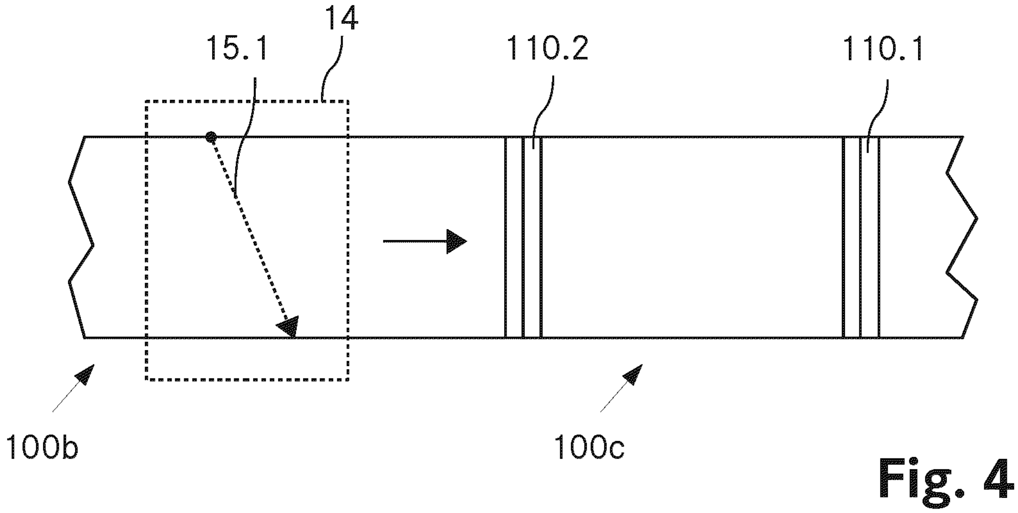
FIG. 4 depicts the guidance of the laser light beam during the insertion of the grooves into the moving doctor blade band from FIGS. 2 and 3.

FIG. 4 depicts a situation after which the two grooves 110.1, 110.2 have been inserted and shortly before the third V-shaped groove 110.3 is inserted. Since the doctor blade band is moved at a constant speed (to the right in FIG. 4) while the laser processing device 14 remains in place, the focus of the laser light beam is guided over the doctor blade band in an oblique direction 15.1. This makes it possible to introduce a groove running perpendicular to the longitudinal direction despite the doctor blade band passing through. During the processing operation, the laser light beam 15 is thus moved both in a direction parallel to the longitudinal direction and perpendicular to it.

Figure 5:
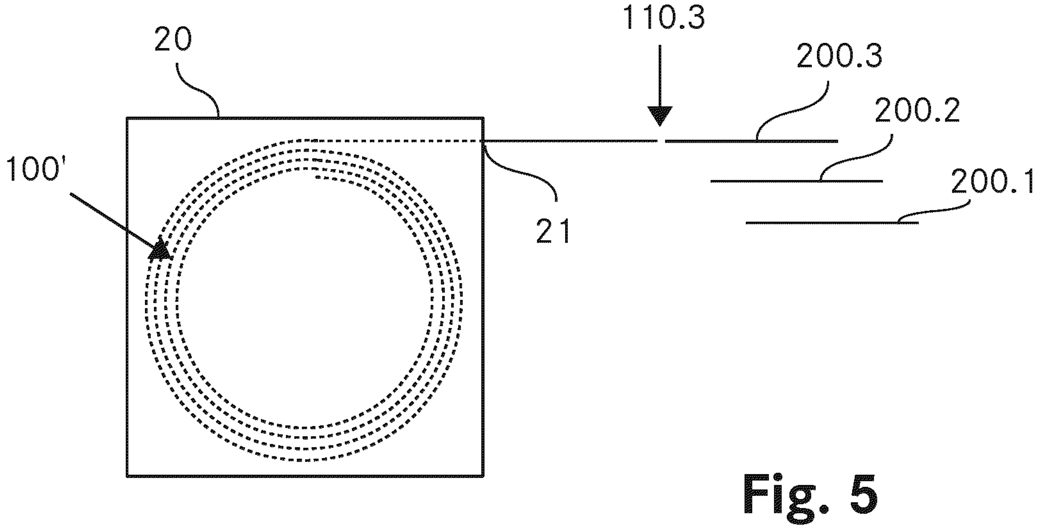
FIG. 5 depicts on the left side, the finished doctor blade band in wound form in a doctor blade box with a slit-shaped removal opening. The right side schematically depicts the cutting of individual doctor blades from the doctor blade band.

FIG. 5 depicts on the left the completely finished doctor blade band 100', which has grooves running at regular intervals along its entire length at right angles to the longitudinal direction, in wound-up form in a doctor blade box 20 or container, respectively.

The doctor blade band 100' can be removed from the doctor blade box 21 through a slit-shaped opening 21.

FIG. 5 on the right illustrates the situation in which two individual doctor blades 200.1, 200.2 have already been cut to length or separated from the doctor blade band 100' and a third individual doctor blade 200.3 has just been separated by buckling the groove 110.3.

The individual doctor blades thus obtained can then be used in a printing machine, e.g., to strip off printing ink in gravure or flexographic printing.

Figure 6:
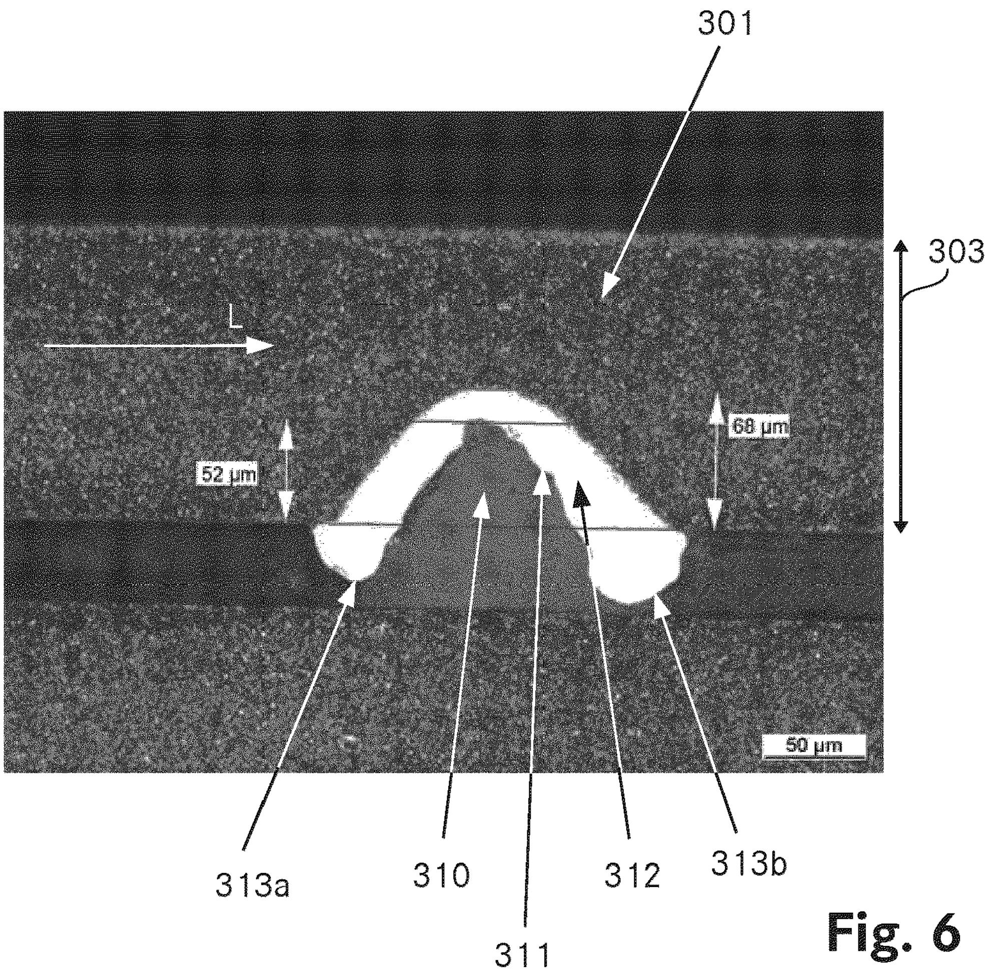
FIG. 6 depicts a micrograph of a steel doctor blade band in the area of a U-shaped groove made by laser machining.

FIG. 6 depicts a micrograph of a steel doctor blade band in the area of a U-shaped groove 310 made by laser machining. The steel doctor blade band has a base body 301 made of steel with a thickness 303 of 0.15 mm. The longitudinal direction L runs in the horizontal direction in FIG. 6.

The groove 310 has a depth of about 52 μm and a width at the upper end (measured in the longitudinal direction) of about 100 μm. An edge region 312 adjacent to the groove surface 311 (appearing light in FIG. 6) is a heat-affected zone generated by the laser processing with a different grain structure and microstructure compared to the more interior region of the base body 301. The edge region 312 has a thickness of approx. 15-30 μm.

On both sides of the groove 310, there is also a rib-like projection 313*a*, 313*b* running along the entire width of the doctor body (the direction of the width runs in the direction of the image plane in FIG. 6). The protrusions 313*a*, 313*b* were directly generated during laser processing.

Figure 7:
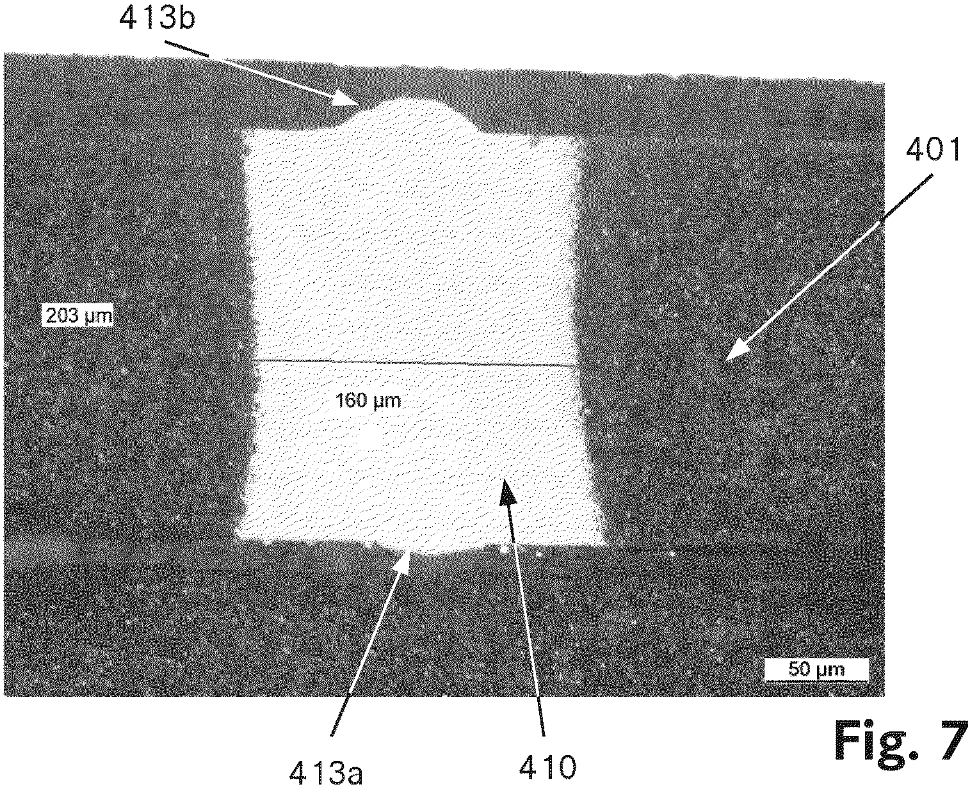
FIG. 7 depicts a micrograph of a steel doctor blade band in the area of a predetermined breaking point introduced by laser processing in the form of a continuous heat-affected zone with altered grain structure and microstructure.

FIG. 7 depicts a micrograph of a steel doctor blade band in the area of a predetermined breaking point 410 introduced by laser processing. The steel doctor blade band has a base body 401 made of steel with a thickness of approx. 0.20 mm.

The longitudinal direction is also horizontal in FIG. 7. The predetermined breaking point 410 is designed as a heat-affected zone which has a modified microstructure compared with the areas adjacent in the longitudinal direction (light areas). A rib-like projection 413*a*, 413*b* is formed in the area of the predetermined breaking point on the upper side and on the lower side and extends over the entire width of the doctor blade band.

The methods and doctor blades described above are to be understood as illustrative examples only, which may be modified within the scope of the invention.

For example, it is possible to use differently shaped doctor blade bands, e.g., with rounded or chamfered working edges, and/or to provide a doctor blade band made of a different material, e.g., a plastic.

In principle, it is also possible during the processing of the doctor blade band 100 to stop the band each time it reaches the point to be processed, to insert the respective groove and then to move the doctor blade band further. In this case, the laser processing system can be simplified, since only a deflection of the laser light beam 15 in one spatial direction is required to insert the grooves.

Furthermore, several doctor blade bands can be run in parallel next to each other and processed with the same laser processing system. This allows the throughput to be increased.

The cross-sectional shapes of the grooves 110.1, 110.2, 110.3 can in principle also be selected differently, e.g., rectangular or asymmetrical. Likewise, the dimensions of the grooves can be adapted to special materials if required.

The predetermined breaking point 410 in the doctor blade of FIG. 7 can be produced without rib-like protrusions 413*a*, 413*b* if the process parameters are selected accordingly. The same applies to the doctor blade shown in FIG. 6.

In summary, it can be stated that a novel and highly efficient solution has been found for the supply of cut-to-length doctor blade bands. Doctor blade bands produced in this way and individual doctor blades that can be cut to length from them are of high quality and, in particular, fully suitable for doctoring printing ink in printing technology.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

We claim:

1. A doctor blade band configured to be cut into individual doctor blades for at least one of printing technology, for gravure printing, flexographic printing and screen printing, the doctor blade band comprising:

a flat and elongate base body comprising a working edge region formed in a longitudinal direction, and continuous predetermined breaking points arranged at defined intervals along the longitudinal direction transversely to the longitudinal direction; the predetermined breaking points extending over the entire width of the doctor blade band from a rear edge of the doctor blade opposite the working edge to the working edge, and whereby distances between neighboring predetermined breaking points are 10 cm-5 m.

2. The doctor blade band according to claim 1, wherein the predetermined breaking points are arranged over a width of the doctor blade band, such that the doctor blade band is substantially uniformly weakened with respect to breaking behavior over the width of the doctor blade band.

3. The doctor blade band according to claim 1, wherein the doctor blade band comprises no perforations in the region of the continuous predetermined breaking points.

4. The doctor blade band according to claim 1, wherein material of the doctor blade band at the predetermined breaking points at least partially comprises at least one of a different grain structure, microstructure, hardness and brittleness as compared with regions of the doctor blade band which adjoin the predetermined breaking points in the longitudinal direction.

5. The doctor blade band according to claim 1, wherein the predetermined breaking points comprise continuous grooves extending transversely to the longitudinal direction.

6. The doctor blade band of claim 5, wherein the grooves comprise decreasing width with increasing depth.

7. The doctor blade band according to claim 5, wherein the grooves comprise a depth of at least one of 20-80% of the thickness of the doctor blade band.

8. The doctor blade band according to claim 5, wherein the doctor blade band comprises in edge regions adjacent to groove surfaces at least one of a different grain structure, microstructure, hardness and brittleness than an inner region of the doctor blade band lying further inside the base body.

9. The doctor blade band according to claim 8, wherein the edge regions comprise a thickness of 1-50 μm.

10. The doctor blade band according to claim 1, wherein the continuous predetermined breaking points are produced by laser processing.

11. The doctor blade band according to claim 1, wherein the doctor blade band comprises a steel base body.

12. The doctor blade band according to claim 1, wherein the doctor blade band comprises a thickness of 0.05-0.35 mm.

13. The doctor blade band according to claim 1, wherein the doctor blade band is arranged in a roll in a container comprising an opening configured for removing the doctor blade band.

14. A method for producing a doctor blade band comprising the steps of:

forming a flat and elongate base body comprising a working edge region formed in a longitudinal direction; and forming at least one of continuous predetermined breaking points and continuous grooves running transversely to a longitudinal direction into the doctor blade band at defined intervals of 10 cm-5 m along the longitudinal direction; whereby the predetermined breaking points or the continuous grooves extend over the entire width of the doctor blade band from a rear edge of the doctor blade opposite the working edge to the working edge.

15. The method according to claim 14, further comprising the steps of continuously moving the doctor blade band in the longitudinal direction during the insertion of the predetermined breaking points.

16. The method according to claim 14, further comprising the steps of introducing the predetermined breaking points with a laser light beam.

17. The method according to claim 16, further comprising the steps of moving a focus of the laser light beam on the doctor blade band both in longitudinal direction and a perpendicular direction with respect to the doctor blade band.

18. The method according to claim 16, further comprising the steps of controlling power of the laser light beam such that at least one of grain structure of the doctor blade band and microstructure of the doctor blade band is at least one of changed at the predetermined breaking points, increases at least one of hardness and brittleness in regions of the predetermined breaking points, and produces continuous grooves running transversely to the longitudinal direction are produced by material removal.

19. The doctor blade band according to claim 5, wherein the grooves have a depth of 35-65% of the thickness of the doctor blade band.

20. The method according to 14, whereby the elongate base body is made of steel and the at least one of continuous predetermined breaking points and continuous grooves are produced in the steel base body exclusively by laser processing.

* * * * *